(12) United States Patent
Cronan

(10) Patent No.: US 11,782,884 B2
(45) Date of Patent: *Oct. 10, 2023

(54) METADATA-DRIVEN TIERED STORAGE

(71) Applicant: 5th Kind, Inc., Los Angeles, CA (US)

(72) Inventor: Stephen Cronan, Los Angeles, CA (US)

(73) Assignee: 5th Kind, Inc., Los Angeles, CA (US)

(*) Notice: Subject to any disclaimer, the term of this patent is extended or adjusted under 35 U.S.C. 154(b) by 10 days.

This patent is subject to a terminal disclaimer.

(21) Appl. No.: 17/410,007

(22) Filed: Aug. 24, 2021

(65) Prior Publication Data

US 2021/0382855 A1 Dec. 9, 2021

Related U.S. Application Data

(63) Continuation of application No. 16/416,538, filed on May 20, 2019, now Pat. No. 11,106,637.

(51) Int. Cl.
*G06F 16/185* (2019.01)
*G06F 16/13* (2019.01)

(52) U.S. Cl.
CPC ............ *G06F 16/185* (2019.01); *G06F 16/13* (2019.01)

(58) Field of Classification Search
None
See application file for complete search history.

(56) References Cited

U.S. PATENT DOCUMENTS

| | | | |
|---|---|---|---|
| 2007/0113289 A1 | 5/2007 | Blumenau | |
| 2010/0057671 A1* | 3/2010 | Riemers | G06F 16/1824 707/E17.009 |
| 2014/0122424 A1* | 5/2014 | Barnes | G06F 16/13 707/823 |
| 2017/0048285 A1* | 2/2017 | Pearl | G06F 16/11 |
| 2017/0124095 A1* | 5/2017 | Diederich | G06F 16/113 |
| 2018/0077420 A1 | 3/2018 | Dunham et al. | |
| 2018/0307759 A1 | 10/2018 | Raghavan et al. | |
| 2020/0242077 A1* | 7/2020 | Dain | G06F 16/24573 |
| 2020/0242079 A1 | 7/2020 | Dain et al. | |
| 2020/0242159 A1 | 7/2020 | Dain et al. | |
| 2022/0132095 A1* | 4/2022 | Leung | G06T 7/55 |

* cited by examiner

*Primary Examiner* — Dawaune A Conyers
(74) *Attorney, Agent, or Firm* — Ansari Katiraei LLP; Arman Kaitraei; Sadiq Ansari

(57) ABSTRACT

A metadata-driven file system prioritizes the distribution of files across different storage devices based on arbitrary file metadata matching to different file usage scenarios defined within one or more workflows or taxonomies. The file metadata may be tagged with different key-value pairs from the defined workflows or taxonomies. Upon receiving a file or file access request, the metadata-driven file system matches the file metadata to a key-value pair combination of the taxonomy, and stores the file to a storage device that is selected using a storage rule that is defined for the matching key-value pair combination. The taxonomy may be defined with other programmatic file operations that the metadata-driven file system may perform against files with matching metadata.

20 Claims, 12 Drawing Sheets

METADATA-DRIVEN TIERED STORAGE

CLAIM OF BENEFIT TO RELATED APPLICATIONS

This application is a continuation of the U.S. non-provisional application Ser. No. 16/416,538, entitled "METADATA-DRIVEN TIERED STORAGE", filed May 20, 2019.

BACKGROUND INFORMATION

Files may be moved between different storage devices for performance, cost, and/or other reasons. A file system may use a file distribution policy to control the distribution of the files to the different storage devices.

Most Frequently Used ("MFU") or Most Recently Used ("MRU") are examples of two common file distribution policies that base the distribution of files across different storage devices on the frequency or time with which different files are accessed. Other file distribution policies may base the file distribution on file size, file type, or other file attributes.

Basing the file distribution on file properties or file attributes fails to account for the workflows and actual file access needs of an organization. For example, a first file may not be accessed as much, or as recently as, a second file. A file system, that uses MFU or MRU policies, may store the second file in a faster storage device than the first file even though the first file may have greater significance to an ongoing workflow of the organization. In this example, the MFU or MRU policies may lead to a suboptimal file distribution as there is greater delay associated with accessing the more pertinent first file than the less pertinent, but more frequently accessed second file.

Another shortcoming of existing file distribution policies is the application of the same one or more rules to all files distributed across the different storage devices. The rules determine which storage device to use in storing different files. Such application of the same rules to all files of an organization may run counter to the different workflows or needs of the organization. For instance, the different workflows may prioritize access to files based on different file attributes, workflow requirements, file contents, and/or other parameters.

DETAILED DESCRIPTION OF PREFERRED EMBODIMENTS

The following detailed description refers to the accompanying drawings. The same reference numbers in different drawings may identify the same or similar elements.

An organization may distribute its files across different storage devices for cost, performance, and/or other reasons. The organization may use different sets of the stored files as part of different organizational workflows. Accordingly, each workflow may prioritize access to a different set of the files distributed across the storage devices. In some embodiments, the workflows may prioritize access to a different set of files based on different workflow requirements.

Systems and methods, as described herein, provide a metadata-driven file system for prioritizing the distribution of files across different storage devices based on different workflows and usage of the files within the different workflows. In some embodiments, the metadata-driven file system may move the files between the storage devices based on the file metadata matching to different workflows rules.

The file metadata as well as the workflow rules may be defined according to one or more taxonomies. Each taxonomy may be defined with an arbitrary set of elements that specify values, states, status, conditions, parameters, and/or other organizational, file, or entity data. Each workflow rule may correspond to a different stage of a workflow, and may therefore specify an optimal access location amongst the different storage devices for accessing files that pertain to that stage of the workflow by virtue of having file metadata that matches to a particular set of elements from a taxonomy used in defining the workflow rule.

Figure 1:
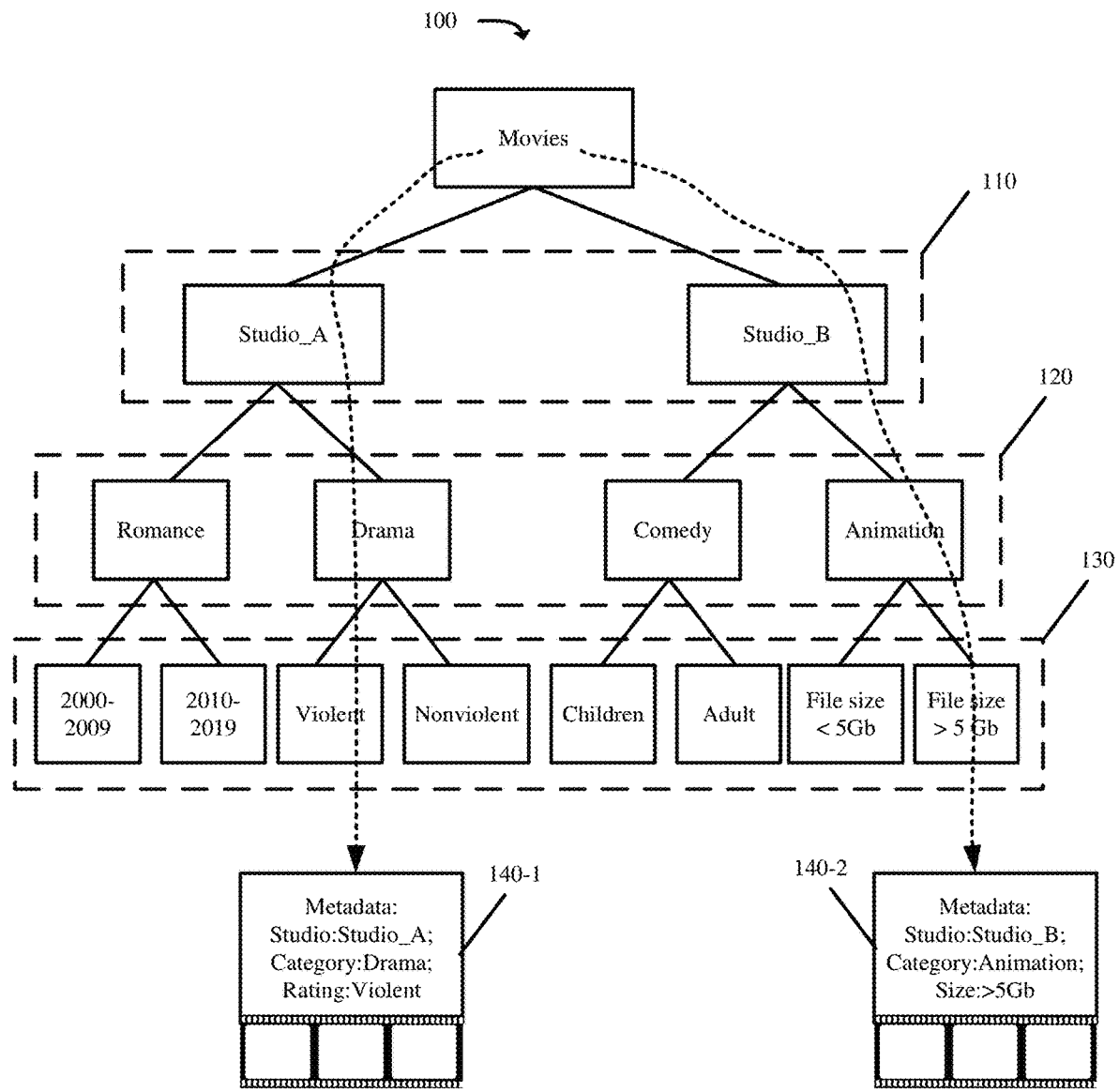
FIG. 1 illustrates an example three-level taxonomy for classifying files within an organization in accordance with some embodiments.

FIG. 1 illustrates an example three-level taxonomy 100 for classifying files within an organization in accordance with some embodiments. As shown in FIG. 1, taxonomy 100 is presented with first level 110, second level 120, and third level 130 for classifying movie assets.

At each level 110, 120, and 130, a file or movie asset may be defined with one of two different entries. Accordingly, taxonomy 100 allows for up to 8 unique classifications.

The metadata-driven file system may impose taxonomy 100 on each file that is entered into, uploaded, or otherwise made part of the organization. For instance, a user may classify each new file that is entered into the organization by specifying one of the two values for each of first level 110, second level 120, and third level 130 of taxonomy 100. In some embodiments, the organization may automatically classify files according to taxonomy 100 without user input. For instance, the metadata-driven file system may scan, open, or otherwise analyze an uploaded file for a movie asset to determine how to classify the file at first level 110, second level 120, and third level 130 of taxonomy 100.

The taxonomy specified for each file may be stored as part of the file metadata. In some embodiments, the file metadata is stored with the file. For instance, the file metadata may be stored in the file header or may be embedded elsewhere in the file. In some other embodiments, the file metadata is stored separate from the file. For instance, the file metadata may be stored in a metadata database that can be queried using the file name, a file checksum, or other file identifier associated with the asset file.

In some embodiments, the file metadata may be specified as a key-value pair definition. Each key-value pair of the file metadata may therefore include a key that corresponds to a particular level from a selected taxonomy, and the associated value for that key corresponds to a selected entry from that particular level of the taxonomy. In some other embodiments, the metadata may be specified as a delimited list of values, a linked list, and/or other data for defining a file within one or more taxonomies.

FIG. 1 also illustrates an example of first file 140-1 and second file 140-2 (herein sometimes collectively referred to as "files 140" or individually as "file 140") with metadata defined according to taxonomy 100. As shown in FIG. 1, first file 140-1 includes a first set of metadata classifying first file 140-1 according to a first set of key-value pairs from taxonomy 100, and second file 140-2 includes a different second set of metadata classifying second file 140-2 according to a different second set of key-value pairs from taxonomy 100.

Taxonomy 100 is an example of one taxonomy that can be used by the metadata-driven file system to provide metadata-driven tiered storage. The metadata-driven file system may support other taxonomies that are of greater or lesser length than taxonomy 100 (e.g., more or less than three levels), and that have more or less keys at different levels of the taxonomy. Moreover, the metadata-driven file system may support an organization that defines multiple taxonomies for different workflows of the organization. The file metadata may associate a file with one or more of the defined taxonomies.

In some embodiments, the taxonomy keys (e.g., key at levels 110, 120, and 130) may be used to track progression of a file through different stages of a particular workflow. For example, the different stages may correspond to different status that can be assigned to a file as the file progresses through the workflow. Continuing with the example, the taxonomy may include a key with a first value that can be used to define a first status for an unverified file, and a second value that can be used to define a different second status for a verified file. Other examples of taxonomy keys that can be used to define different stages in a workflow may include a key with a first value for an unapproved state of a file, and a second value for an approved state of the file; a key with a first value to identify an unedited file, and a second value to identify an edited file; a key with a first value to identify a confidential file, and a second value to identify a non-confidential file; and a key with a first value to restrict file access to a first set of users, and a second value to restrict file access to a different second set of users. Taxonomy 100 is not limited to these example keys, and can defined with any arbitrary or desired keys and values.

The metadata-driven file system may automatically define and/or update the file metadata according to a taxonomy that is defined based on different workflows by analyzing the files, and by monitoring interactions with the files. For instance, when a user changes the status of a file from an unapproved state to an approved state, the metadata-driven file system may detect the change, may detect that the change impacts a particular key defined in the taxonomy, and may update the value for that particular key in the file metadata.

In some embodiments, the taxonomy keys may, additionally or alternatively, be defined according to properties of the files. For instance, one or more of the taxonomy keys can be defined based on the size of a file, the file type, the last modified timestamp, the file encoding, the file resolution, other file attributes, file characteristics, and/or other file properties. Here again, the metadata-driven file system may automatically define and/or update the file metadata for different files by monitoring the file properties, detecting which file properties correspond to keys in the taxonomy and updating the value for those keys in the file metadata.

In some embodiments, the taxonomy keys may also be defined in a manner that can be used to control the distribution of files. For instance, the taxonomy may include keys for prioritizing files, specifying a desired storage location or region for files, and/or other controls.

In summary, the taxonomy can be created to classify files according to one or more custom-defined workflows of an organization, file properties, desired controls, and/or any arbitrary set of data that is relevant to the organization, that is relevant to the workflows executed in the organization, or that is relevant to how files are accessed within the organization. The metadata-driven file system may use one or more defined taxonomies to distribute the organization's files across the organization's storage in a manner that optimizes workflow execution and file access. In particular, the metadata-driven file system may move files between different storage devices of the organization or of other systems accessed by the organization based on workflow rules that are defined according to one or more taxonomies, matching the workflow rules to the file metadata, and storing each file at a storage device or storage location prescribed by a workflow rule that matches to the metadata of that file.

Figure 2:
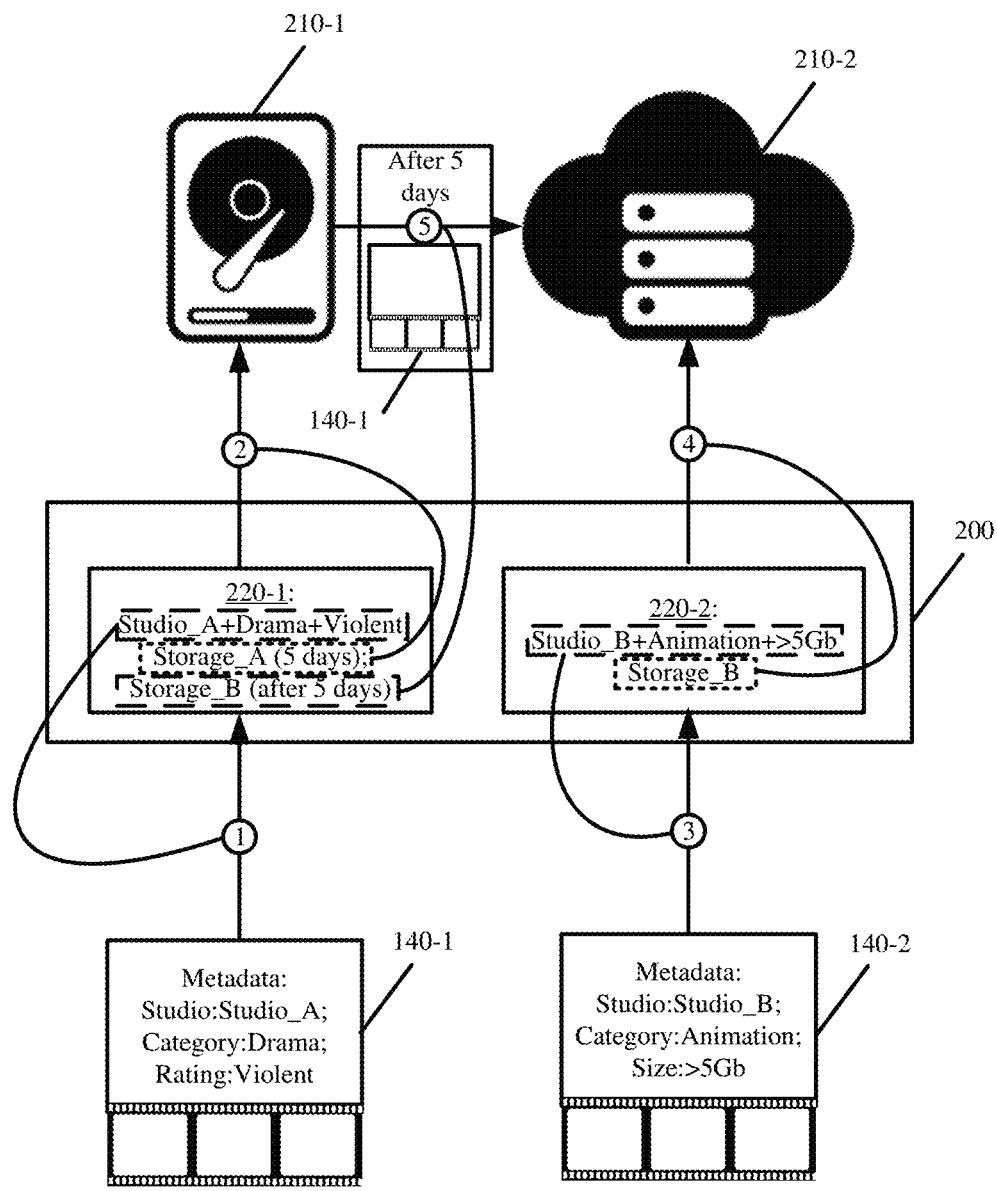
FIG. 2 illustrates an example of a metadata-driven file system moving different files across different storage devices based on file metadata and different workflow rules defined for the file metadata in accordance with some embodiments described herein.

FIG. 2 illustrates an example of metadata-driven file system 200 moving different files across different storage devices based on file metadata and different workflow rules defined for the file metadata in accordance with some embodiments described herein. In particular, meta-driven file system 200 may move first file 140-1 and second file 140-2 between first storage device 210-1 and second storage device 210-2 (herein sometimes collectively referred to as "storage devices 210" or individually as "storage device 210"). Storage devices 210 may have different performance, cost, storage, location, and/or other characteristics, and may represent different storage tiers on which files of the organization may be stored and accessed. In some embodiments, storage devices 210 may be operated by the organization or by different organizations and/or systems. For instance, storage device 210-1 may include an onsite storage device, and storage device 210-2 may include a storage device operated by a cloud-storage operator, a social media platform, a video platform, or other third-party system.

The organization may define a first workflow that uses first file 140-1, and a different second workflow that uses second file 140-2. For instance, first file 140-1 may be created and used by a first team of the organization for a first purpose, and second file 140-2 may be created and used by a second team of the organization for a different second purpose.

The first workflow may be defined with first rule 220-1 that metadata-driven file system 200 uses to control the storage of first file 140-1 and other files of the first workflow.

Similarly, the second workflow may be defined with second rule 220-2 that metadata-driven file system 200 uses to control the storage of second file 140-2 and other files of the second workflow.

As shown in FIG. 2, first rule 220-1 is defined with a first set of metadata that matches (at 1) to the metadata of first file 140-1. First rule 220-1 also specifies initially storing files of the first workflow (e.g., first file 140-1) to first storage device 210-1 for a period of five days before moving the files to second storage device 210-1. Accordingly, based on the metadata of first file 140-1 and first rule 220-1, metadata-driven file system 200 determines that first file 140-1 is part of the first workflow, and initially stores (at 2) first file 140-1 to first storage device 210-1.

Second rule 220-2 includes a second set of metadata that matches (at 3) to the metadata of second file 140-2. Second rule 220-2 specifies storing files of the second workflow (e.g., second file 140-2) to second storage device 210-2. Based on the metadata of second file 140-2 and second rule 220-2, metadata-driven file system 200 stores (at 4) second file 140-2 to second storage device 210-2. Consequently, metadata-driven file system 200 stores first file 140-1 to a different storage device 210 than second file 140-2 based on different organizational workflow rules that apply to different sets of metadata of each file 140.

Continuing with the example from FIG. 2, metadata-driven file system 200 may also transfer the files between storage devices 210 differently. For instance, after 5 days of storage on first storage device 210-1, metadata-driven file system 200 may move (at 5) first file 140-1 to second storage device 210-2 according to first rule 220-1, whereas second file 140-2 may remain on second storage 210-2 without being moved.

Files may also be moved in response to changes in the file metadata. The metadata for a particular file may change as the status, content, or properties of the particular file change. For instance, as the particular file progresses through a workflow, the file metadata corresponding to the status of the file may change. The file metadata changes may cause the particular file to be subject to a different workflow rule of the same or another workflow. Metadata-driven file system 200 may monitor for changes to the file metadata, may determine the one or more rules that apply to the particular file after the metadata of the particular file changes, and may relocate the particular file from one storage device to another storage device based on the applicable rules.

Figure 3:
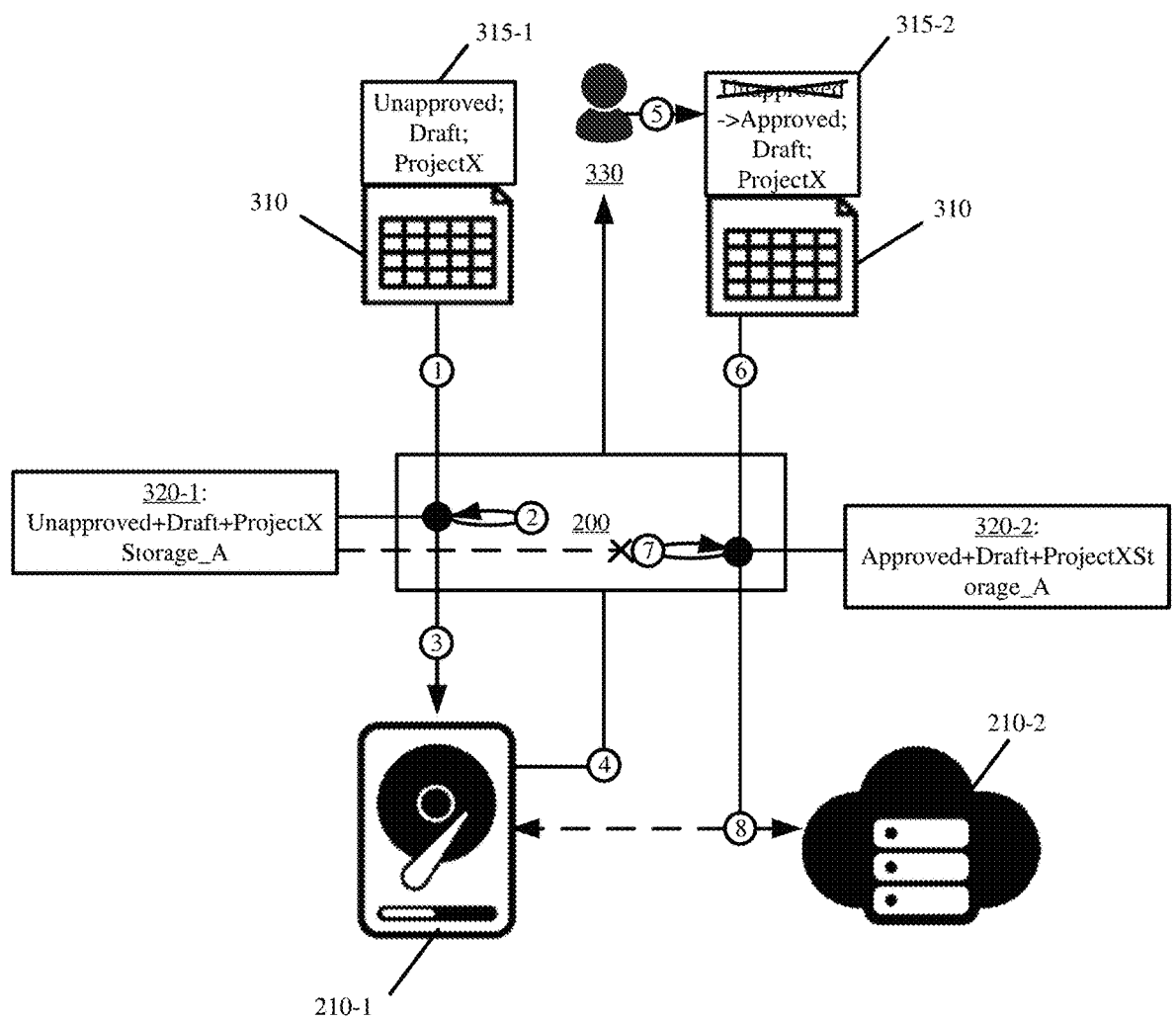
FIG. 3 illustrates an example of the metadata-driven file system moving a file between different storage devices in response to changing metadata of file.

FIG. 3 illustrates an example of metadata-driven file system 200 moving file 310 between different storage devices 210 in response to changing metadata of file 310. As shown in FIG. 3, metadata-driven file system 200 may receive (1) file 310 with first set of metadata 315-1. File 310 may be a newly created file, an uploaded file, or an existing file that has been modified. Metadata-driven file system 200 may determine (at 2) that first set of metadata 315-1 of file 310 matches the metadata that is specified for first rule 320-1 of a first workflow, and may store (at 3) file 310 to first storage device 210-1 based on first set of metadata 315-1 of file 310 matching the metadata that is specified for first rule 320-1 and first rule 320-1 specifying storage of files with matching metadata to first storage device 210-1.

As part of the first workflow, user 330 may access (at 4) file 310 from first storage device 210-1, and may change (at 5) the status of file 310 as part of the access. For example, user 330 may change (at 5) file 310 from an unapproved status to an approved status after reviewing the contents of file 310. In some embodiments, changing (at 5) the file status may create a corresponding change to the file metadata. User 330 may then commit or otherwise submit (at 6) file 310 with the changes to metadata-driven file system 200 for storage.

Metadata-driven file system 200 may scan the metadata of file 310 to determine where to store file 310. In some embodiments, metadata-driven file system 200 may detect the changes that were made to file 310, and/or may detect that the metadata of file 310 changed from first set of metadata 315-1 to second set of metadata 315-2. In some other embodiments, metadata-driven file system 200 may compare second set of metadata 315-2 of file 310 against different workflow rules to determine where to store file 310.

As a result of the file status change (at 5) and/or the accompanying metadata change, file 310 may no longer be part of the first workflow, and may now be part of the second workflow. For instance, the file status change (at 5) may complete the first workflow, and may cause file 310 to become part of the second workflow. In some embodiments, the file status change (at 5) may retain file 310 in the first workflow, but may subject file 310 to a different rule of the first workflow.

Metadata-driven file system 200 may determine (at 7) that second set of metadata 315-2 no longer matches to the metadata defined for first rule 320-1 of the first workflow, but does match to the metadata defined for second rule 320-2 of a second workflow. According to second rule 320-2, metadata-driven file system 200 may move (at 8) file 310 from first storage device 210-1 to second storage device 210-2. In some embodiments, moving (at 8) file 310 may include determining that file 310 was previously stored to first storage device 210-1, deleting a previous copy of file 310 from first storage device 210-1, storing an updated copy of file 310 (e.g., with second set of metadata 315-2) to second storage device 210-2, and updating a link that identifies the storage location of file 310. In some embodiments, moving (at 8) file 310 may include determining that file 310 was previously stored to first storage device 210-1, transferring file 310 from first storage device 210-1 to second storage device 210-2 with any modifications made by user 330, and updating a link that identifies the storage location of file 310.

It should be noted that the metadata of file 310 may change even without the contents or attributes of file 310 changing. For instance, user 330 may access file 310 with first set of metadata 315-1 defining file 310 as having an unapproved status. The user may read text from file 310, and may provide input via an application or interface that changes the status of file 310 from the unapproved status to an approved status. The status change does not affect the contents, attributes, or other properties of file 310. However, the taxonomy that defines the metadata for file 310 may have a key with a value that tracks the status of file 310. Accordingly, the status change may be tracked by changing the file metadata from first set of metadata 315-1 to second set of metadata 315-2.

A conditional workflow rule may be defined according to a set of key-value pairs from a taxonomy and one or more conditions. A conditional workflow rule may apply to files with metadata matching to the set of key-value pairs defined for the conditional workflow rule, and may control the distribution of the matching files based on the one or more conditions.

The conditions may select different storage locations or storage devices for the files based on elements that are not part of the taxonomy. For instance, rule 220-1 from FIG. 2 included a temporal condition for storing metadata-matched file 140-1 to a first storage device for a first duration, and to a different second storage device after the first duration. Other conditions may be based on attributes, properties, contents, and/or characteristics of the files (e.g., size, type, age, etc.), characteristics of the storage devices (e.g., available storage, performance, location, etc.), user access characteristics (e.g., regions where the files are requested most, user devices accessing the files, etc.), and/or other elements that are not part of the taxonomy used to define the conditional workflow rule.

An unconditional workflow rule may distribute files with matching metadata defined for the rule to a common storage location or storage device. Each workflow rule, conditional or unconditional, may specify a one-to-one or one-to-many matching of the rule to one or more sets of metadata. For instance, a workflow rule may be defined with key-value pairs from first level 110 and second level 120 of example taxonomy 100 without specifying a key-value pair for third level 130. Accordingly, files with different key-value pairs for third level 130, but matching key-values pairs for first level 110 and second level 120 may match to the workflow rule, and may be stored to the same storage location or storage device as prescribed by the matching workflow rule.

The storage location or storage device specified for a rule may correspond to a programmatic file operation defined for the rule. In other words, each rule may be defined with key-value combinations that match to the metadata of different files, and may be further defined with a programmatic file operation for specifying the storage location or storage device where the matching files are to be stored. In some embodiments, the rules may be defined with other programmatic file operations.

The programmatic file operations may include scripts, commands, file system calls, and/or other instructions for changing attributes, properties, and/or other characteristics of the matching files. For instance, a programmatic file operation may change user access privileges such that different groups of users may access a file at different times or may have different privileges (e.g., read, write, copy, delete, etc.) when accessing a file. Another programmatic file operation may restrict file access to different times of day or different machines. Another programmatic file operation may include reencoding a file or a creating low-resolution variant of a file when the metadata of the file matches a particular workflow rule defined with that programmatic file operation.

Figure 4:
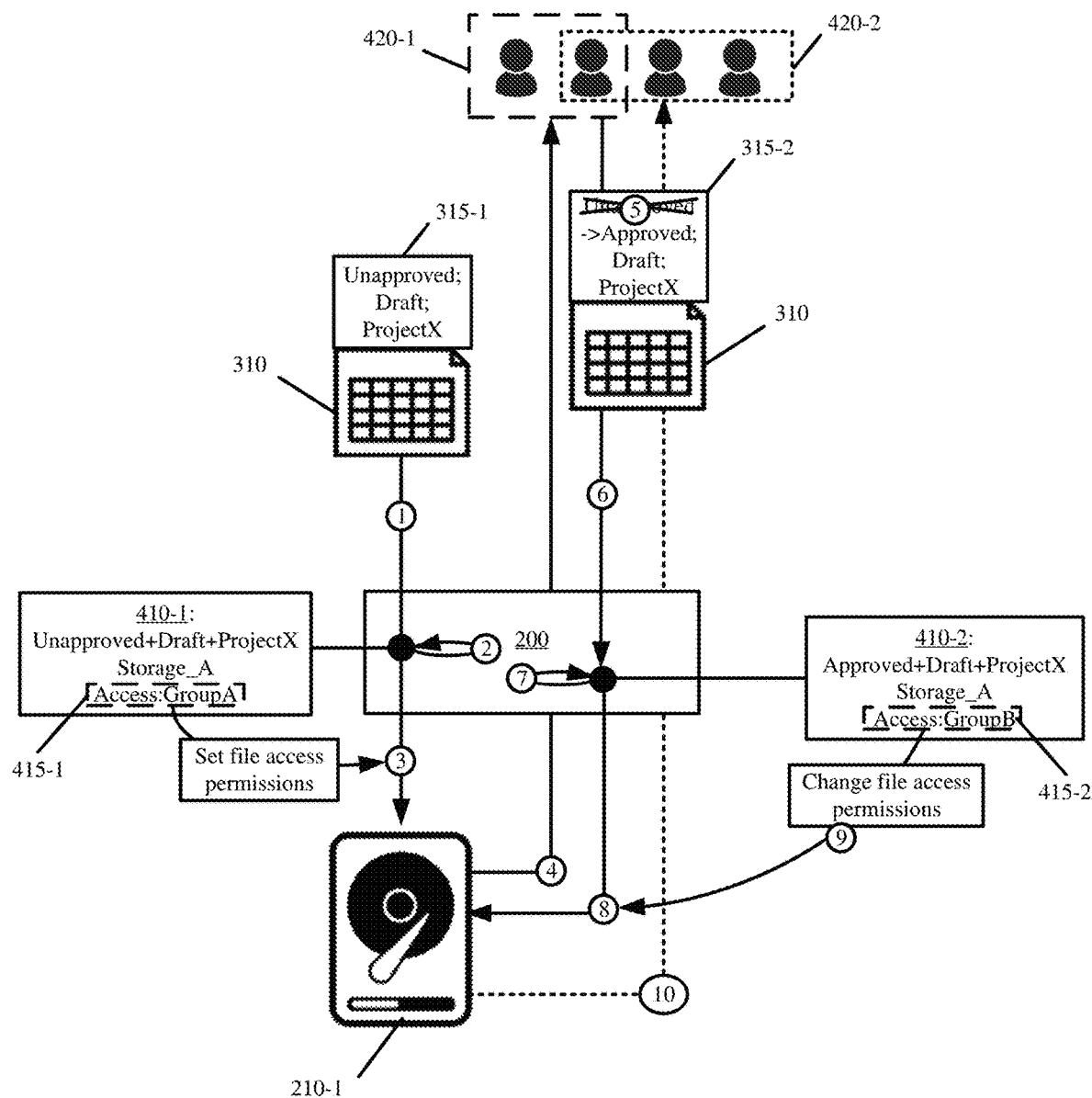
FIG. 4 conceptually illustrates the metadata-driven file system implementing different programmatic file operations on a file according to different matching workflow rules in accordance with some embodiments.

FIG. 4 conceptually illustrates metadata-driven file system 200 implementing different programmatic file operations on file 310 according to different matching workflow rules in accordance with some embodiments. FIG. 4 illustrates metadata-driven file system 200 receiving (at 1) file 310 with first set of metadata 315-1, determining (at 2) that first set of metadata 315-1 matches to the key-value pairs of first rule 410-1, and storing (at 3) file 310 to first storage device 210-1 based on first rule 410-1.

In FIG. 4, first rule 410-1 further specifies a programmatic file operation to store file 310 with first set of access privileges 415-1. The programmatic file operation may therefore restrict access to file 310. In this example, first set of access privileges 415-1 limit read and write access to file 310 to first group of users 420-1. Other users may be limited to read only access or may be prevented from accessing file 310 when stored to first storage device 210-1 with first set of metadata 315-1.

One or more of the first group of users 420-1 may access (at 4) file 310, and in doing so, may cause (at 5) the metadata of file 310 to change from first set of metadata 315-1 to second set of metadata 315-2. The one or more users may enter (at 6) file 310 with second set of metadata 315-2 back into storage.

Metadata-driven file system 200 may detect the metadata changes, and may determine (at 7) that second rule 410-2 applies to file 310 with second set of metadata 315-2. Second rule 410-2 may include a different programmatic file operation that restricts access to file 310 with second set of metadata 315-2 to a different second group of users 420-2. Metadata-driven file system 200 stores (at 8) file 310 with second set of metadata 315-2 to first storage device 210-1 per second rule 410-2, and changes (at 9) the access privileges of file 310 from first set of access privileges 415-1 to second set of access privileges 415-2 per the programmatic file operation of second rule 410-2.

Consequently, one or more of the first group of users 420-1 that were previously able to view and/or access file 310 may be prevented from viewing and accessing file 310. Alternatively, one or more of the second group of users 420-2 that were previously unable to view and/or access file 310 may view and/or access (at 10) file 310 as a result of metadata-driven file system 200 applying the programmatic file operation of second rule 410-2 to file 310.

Figure 5:
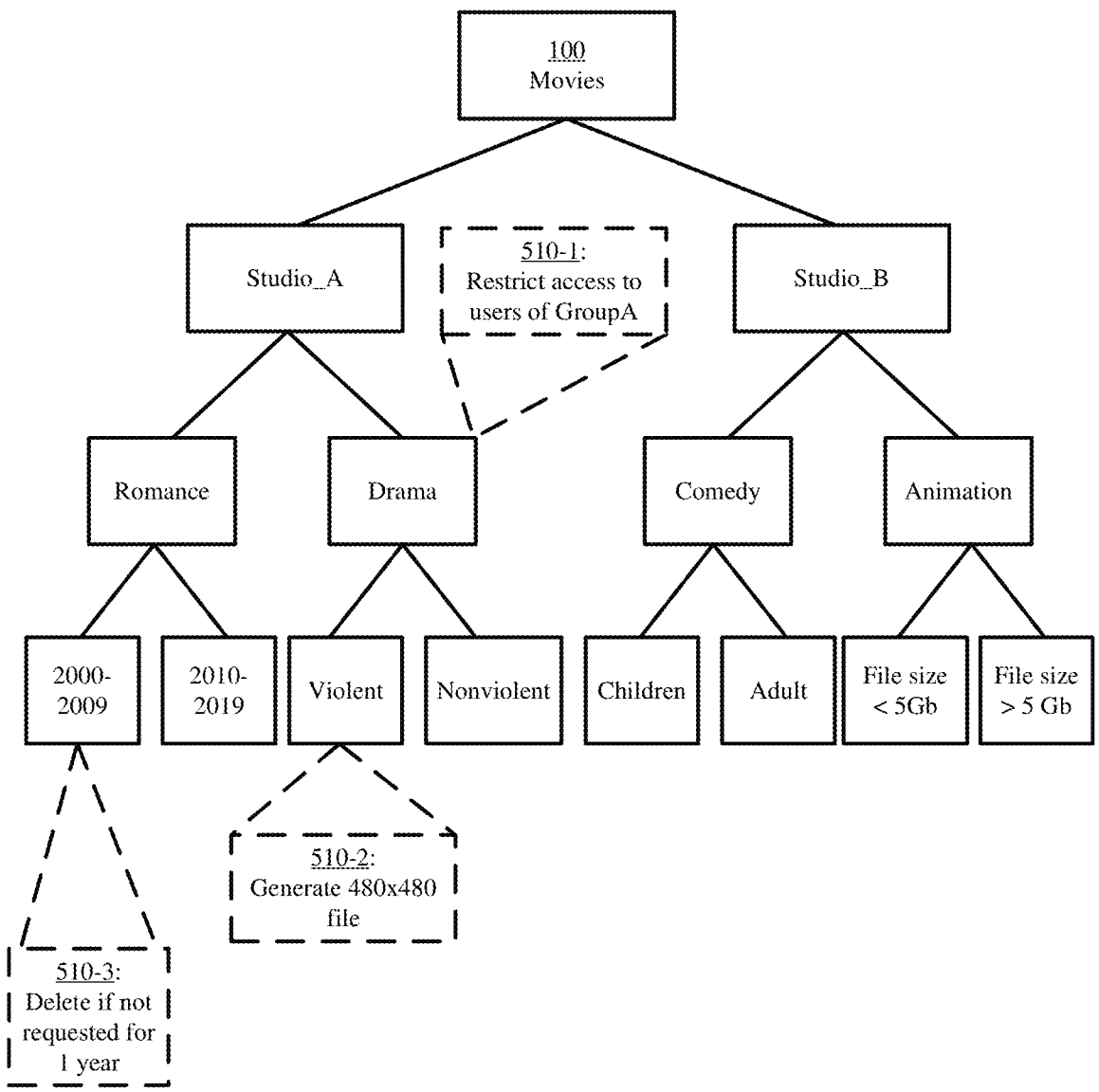
FIG. 5 conceptually illustrates different programmatic file operations that are integrated with different key-value combinations of a taxonomy in accordance with some embodiments described herein.

In some embodiments, the programmatic file operations may be defined as part of the taxonomy. FIG. 5 conceptually illustrates different programmatic file operations that are integrated with different key-value combinations of a taxonomy in accordance with some embodiments described herein. In particular, FIG. 5 modifies taxonomy 100 from FIG. 1 with programmatic file operations 510-1, 510-2, and 510-3 (herein sometimes collectively referred to as "programmatic file operations 510" or individually as "programmatic file operation 510") at different key-value combination of taxonomy. Metadata-driven file system 200 may implement programmatic file operations 510 on files with metadata matching to the key-value combinations.

Programmatic file operation 510-1 is defined for a first set of key-value combinations (e.g., Studio=Studio_A; Type=Drama) of taxonomy 100, and includes operations for changing access privileges of files with metadata that matches the first set of key-value combinations. In some embodiments, metadata-driven file system 200 may enforce the access privileges change by changing one or more properties of the matching files to restrict access for some users while granting access to other users. In some other embodiments, metadata-driven file system 200 may enforce the access privileges change at access time without changing the properties. For instance, metadata-driven file system 200 may receive a first request for a file with metadata matching the first set of key-value combinations. In response to the first request, metadata-driven file system 200 may reference the taxonomy to determine that the first programmatic file operation is defined for the requested file. Metadata-driven file system 200 may then determine whether the user's access privileges satisfy the access privileges that are defined for the first programmatic file operation in the taxonomy.

Programmatic file operation 510-2 is defined for a different second set of key-value combinations (e.g., Studio=Studio_A; Type=Drama, Rating=Violent) of taxonomy 100, and includes operations for creating a low-resolution version of a matching file on a first storage device. Files with metadata matching the second set of key-value combinations also match the first set of key-value combinations defined for the first programmatic file operation. Accordingly, metadata-driven file system 200 may apply the first programmatic file operation and the second programmatic file operation to the same set of files, although the first programmatic file operation may be applied to other files as well.

Programmatic file operation 510-3 is defined for a third set of key-value combinations (e.g., Studio=Studio_A; Type=Romance; Age=2000-2009) of taxonomy 100, and specifies deleting files from storage after one year of not being requested. To implement programmatic file operation 510-3, metadata-driven file system 200 may query for stored files with metadata that matches the third set of key-value combinations, may determine a last-accessed timestamp of the matching files, and may delete the matching files that have a last-accessed timestamp that is more than one year in the past.

The programmatic file operations enhance metadata-driven file system 200 to perform operations beyond managing the distribution of files to different storage devices. In this manner, metadata-driven file system 200, with the programmatic file operations, further optimizes the stored files for the workflows of the organization. For instance, programmatic file operation 510-2 may automatically produce and make available the low-resolution version of an original file without any user action, and the users may have immediate access to the low-resolution version of the original file as a result of entering the original file with metadata that matches the second set of key-value combinations defined for implementing programmatic file operation 510-2.

Figure 6:
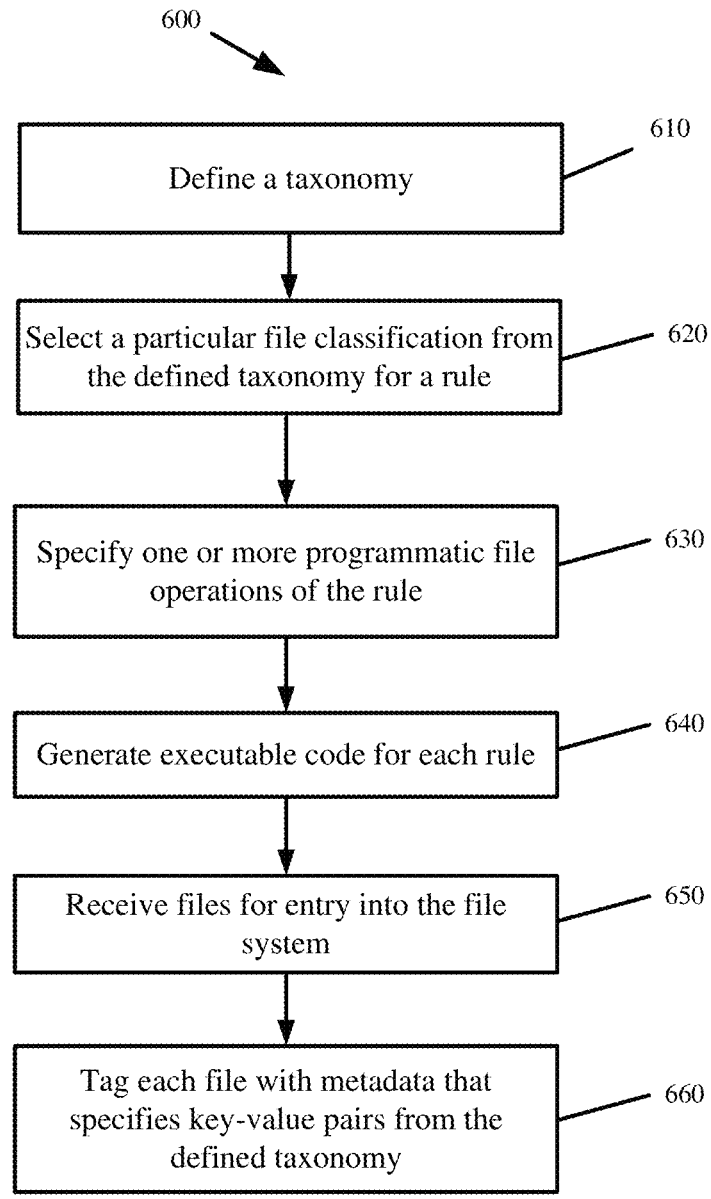
FIG. 6 presents a process for configuring operation of the metadata-driven file system in accordance with some embodiments presented herein.

FIG. 6 presents a process 600 for configuring operation of metadata-driven file system 200 in accordance with some embodiments presented herein. Process 600 may be implemented via a graphical user interface ("GUI") or programmatically via an Application Programming Interface ("API") of metadata-driven file system 200. Users may access the GUI or API to provide inputs to metadata-driven file system 200. The inputs may define a workflow via a taxonomy. The inputs may further define rules for different key-value combinations of taxonomy.

For instance, process 600 may include defining (at 610) a taxonomy by which files are classified. As noted above, the taxonomy may have any number of levels with different key-value pairs at each level. The key-value pairs provide the structure and/or format to one or more workflows of the organization. The key-value pairs may include arbitrary key-value pairs that are based on the one or more workflows, organizational properties, and/or user properties. The key-value pairs may also include key-value pairs that are based on various file properties. For instance, an arbitrary key-value pair may specify a different status, action, stage, data, parameter, or element of a workflow, and a key-value pair based on a file property may classify files based their file extensions.

Process 600 may include defining one or more rules for different key-value combinations of the defined taxonomy. Defining a rule may include selecting (at 620) a particular file classification from the defined taxonomy. Selecting the particular file classification may include selecting a set of key-value pairs from a particular branch of the taxonomy. In other words, process 600 may allow a user to tag different entries from the defined taxonomy in order to specify the set of key-value pairs or metadata for the rule.

Defining the rule may further include specifying (at 630) one or more programmatic file operations to perform on files with metadata that matches the particular file classification. A programmatic file operation may specify storing a file to one of several available storage devices. A programmatic file operation may also include deleting a file, duplicating a file, creating different versions of a file, encoding a file, changing properties of a file (e.g., changing resolution, changing the file type, etc.), compressing a file, and/or other file manipulation operations. A programmatic file operation may, additionally or alternatively, include performing one or more workflow actions on a file. The workflow actions may include changing metadata, status, access privileges, visibility, and/or other operations that do not directly alter the contents or attributes of the file.

Each rule or programmatic file operation of a rule may be defined with one or more conditions. The conditions may include time, event, action, or other triggers for controlling when the programmatic file operation is performed on a file matching the rule definition for that programmatic file operation. Some actions that can trigger different programmatic file operations may include users accessing, manipulating, tagging, and/or changing status, content, attributes, and/or properties of a file. For example, a rule may be defined with a condition that changes a metadata key-value pair for status of a file in response to detecting a user accessing a file, and the change to that key-value pair may grant new users access to the file. As another example, a rule may be defined with a time condition and a programmatic file operation for moving a file from a first storage device to a second storage device after some period of time (e.g., 5 days of storage on the first storage device).

Process 600 may include generating (at 640) executable code for each rule. The code may include scripts, commands, system calls, API calls, function calls, and/or other instructions that can be executed by metadata-driven file system 200 using one or more processors. The taxonomy and the executable code for the associated rules may be entered into a database or other storage that is accessed by metadata-driven file system 200.

Process 600 may include receiving (at 650) files for entry into the file system. Metadata-driven file system 200 may receive (at 650) the files in response to users, devices, systems, or applications uploading, committing, or otherwise entering files to the file system. The received files may be new files or files that previously existed but were accessed by one or more users.

Process 600 may include tagging (at 660) each file with metadata that specifies key-value pairs from the defined taxonomy. In some embodiments, a received file may already include a set of metadata such that the tagging (at 660) operation may include modifying the existing set of metadata in response to any changes to the file or the file progressing through a workflow. The tagged metadata is used to classify the files according to the defined taxonomy. For example, and with reference to taxonomy 100 of FIG. 1, when a user uploads a new file, the user may be asked, via the GUI or API, to select a value for a first key at first level 110 of taxonomy 100. In this example, the user would tag the file to a particular studio (e.g., value for the first key). Based on the selected first key value, the user may be presented with one or more values for a different second key at second level 120 of taxonomy 100. The user selection of the second key value may then trigger a request to select one or more values for a different third key at third level 130 that is presented based on the selection of the second key value. In some embodiments, metadata-data driven file system 200 may automatically tag (at 660) the received (at 650) files with the key-value pairs in response to analyzing the files, user information, and/or other workflow-related information. For instance, metadata-data driven file system 200 may extract or derive metadata that is embedded with the file contents or from various file attributes. In some embodiments, metadata-data driven file system 200 may use artificial intelligence or machine learning to add metadata to a file based on characteristics of the submitting entity (e.g., employee department, projects of an employee, experience level, location, etc.), the submitting device, other files uploaded at or near the same time by the same or other entities, etc.

Figure 7:
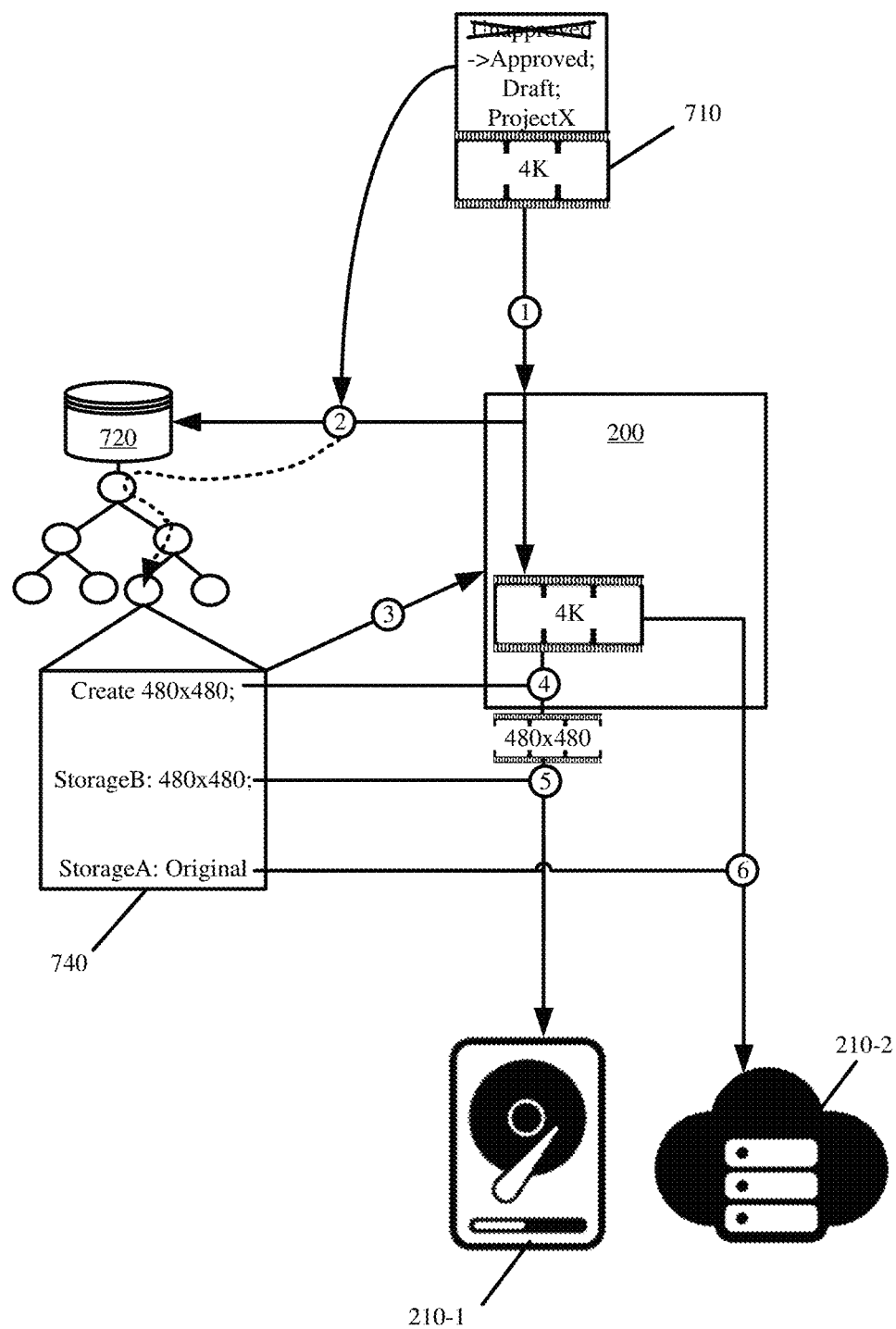
FIG. 7 illustrates the metadata-driven file system enforcing workflow or taxonomy rules in accordance with some embodiments described herein.

FIG. 7 illustrates metadata-driven file system 200 enforcing workflow or taxonomy rules in accordance with some embodiments described herein. Metadata-driven file system 200 may receive (at 1) file 710 with new or changed metadata. The metadata change may occur as an existing file progresses through a workflow and/or one or more users interact with that file causing changes to existing metadata of that file.

In response to receiving (at 1) file 710, metadata-driven file system 200 may query (at 2) database 720 for an applicable rule with a key-value combination that matches the metadata of file 710. In some embodiments, metadata-driven file system 200 may retain the defined taxonomies and their defined rules in memory, and may select an applicable rule to execute from memory based on the metadata of file 710.

In response to the file metadata not matching the key-value combination of a taxonomy/workflow rule, metadata-driven file system 200 may not perform any programmatic file operations on file 710, and may store file 710 to a default storage device. In response to the file metadata matching key-value combination of rule 740, metadata-driven file system 200 may retrieve (at 3) rule 740, and may execute the one or more programmatic file operations of rule 740 on file 710.

In this figure, rule 740 includes three programmatic file operations. Metadata-driven file system 200 generates (at 4) a low-quality encoding of file 710 in response to executing the first programmatic file operation of rule 740. Metadata-driven file system 200 stores (at 5) the low-quality encoding of file 710 to first storage device 210-1 in response to executing the second programmatic file operation of rule 740, and stores (at 6) the original encoding of file 710 to second storage device 210-2 in response to executing the third programmatic file operation of rule 740.

Since metadata-driven file system 200 may move files between different storage locations and/or storage devices without a user expressly initiating the transfer of files (e.g., metadata-driven file system 200 moving a file based on a programmatic file operation of workflow rule), metadata-driven file system 200 may provide an abstraction layer by which users can access a file with the same identifier regardless of which storage device is storing the file and the storage location of the file on that storage device.

In some embodiments, metadata-driven file system 200 may map a first identifier, that is provided to users and used by users to access a particular file, to a different second identifier, that identifies the actual location of the particular file on one of the different storage devices of the organization. The identifier mappings may be stored and tracked in a database. Accordingly, the first identifier may be used as a key for querying the database in order to retrieve the corresponding second identifier.

The first identifier may be a Uniform Resource Identifier ("URI") that a user device may use to access a particular file. In some embodiments, the URI may specify a path that is user-specific, project-specific, workflow-specific, or otherwise identifies a logical structure used to store files of the user, project, workflow, or other grouping of files. In some embodiments, the first identifier may be defined as any unique sequence of characters for identifying a particular file.

The second identifier, mapping to the first identifier, may provide the actual file path for accessing the particular file that is logically identified by the first identifier. The second identifier may include a URI that is different than the URI of the first identifier, and that accesses the particular file from a file path on a particular storage device.

Figure 8A:
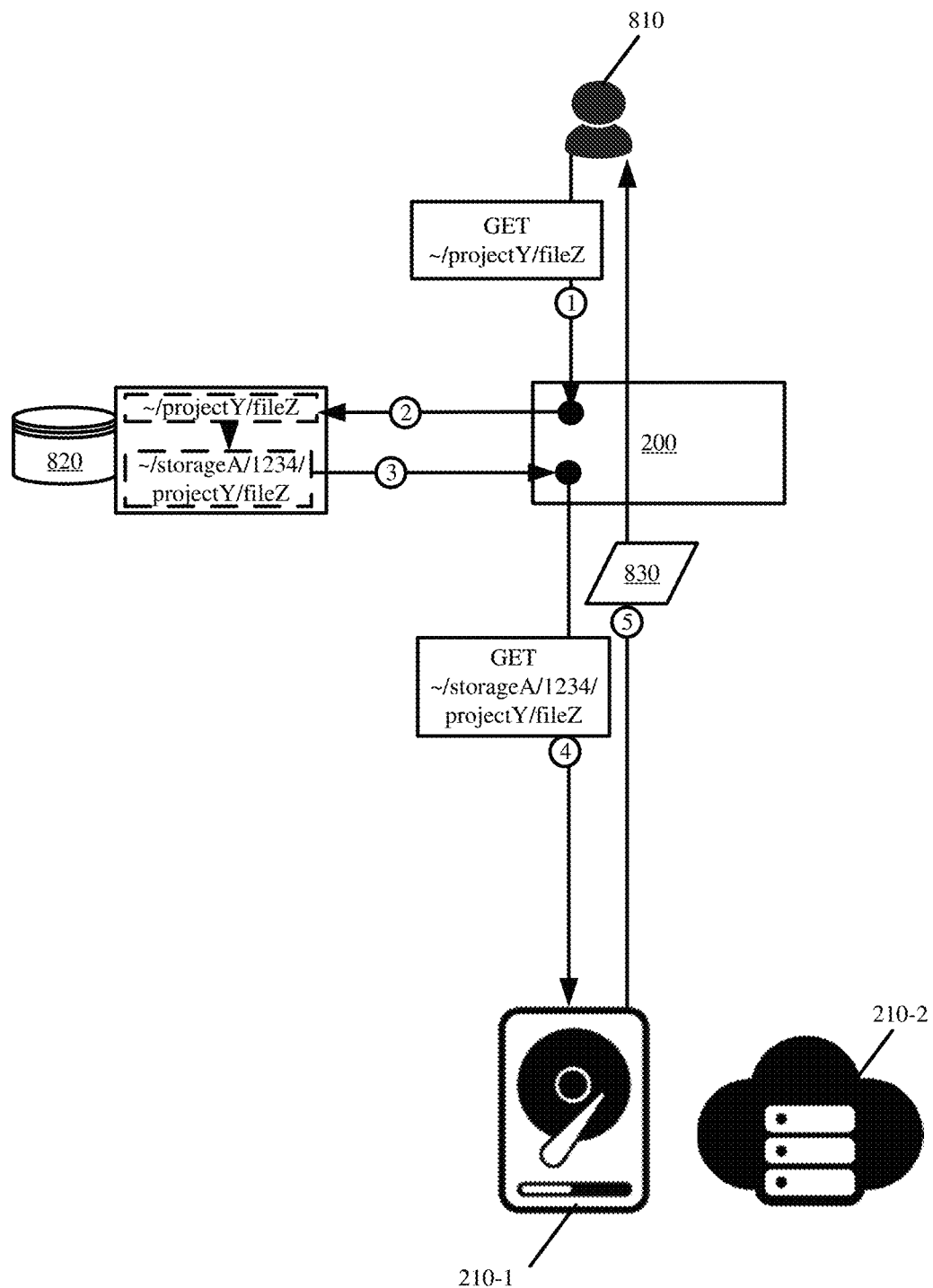
FIGS. 8A, 8B, and 8C illustrate an example of the file mapping operations performed by the metadata-driven file system in accordance with some embodiments described herein.
Figure 8B:
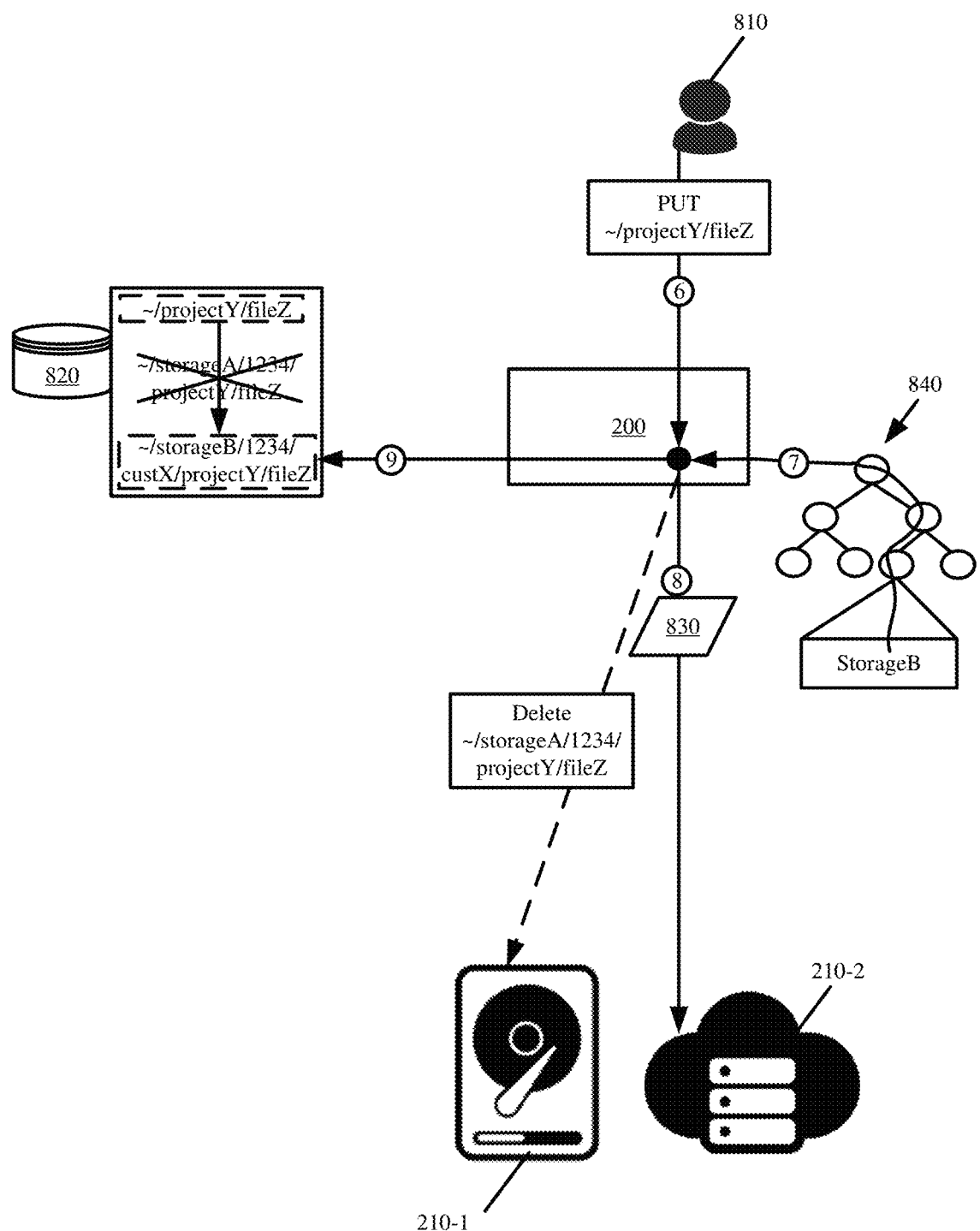
Figure 8C:
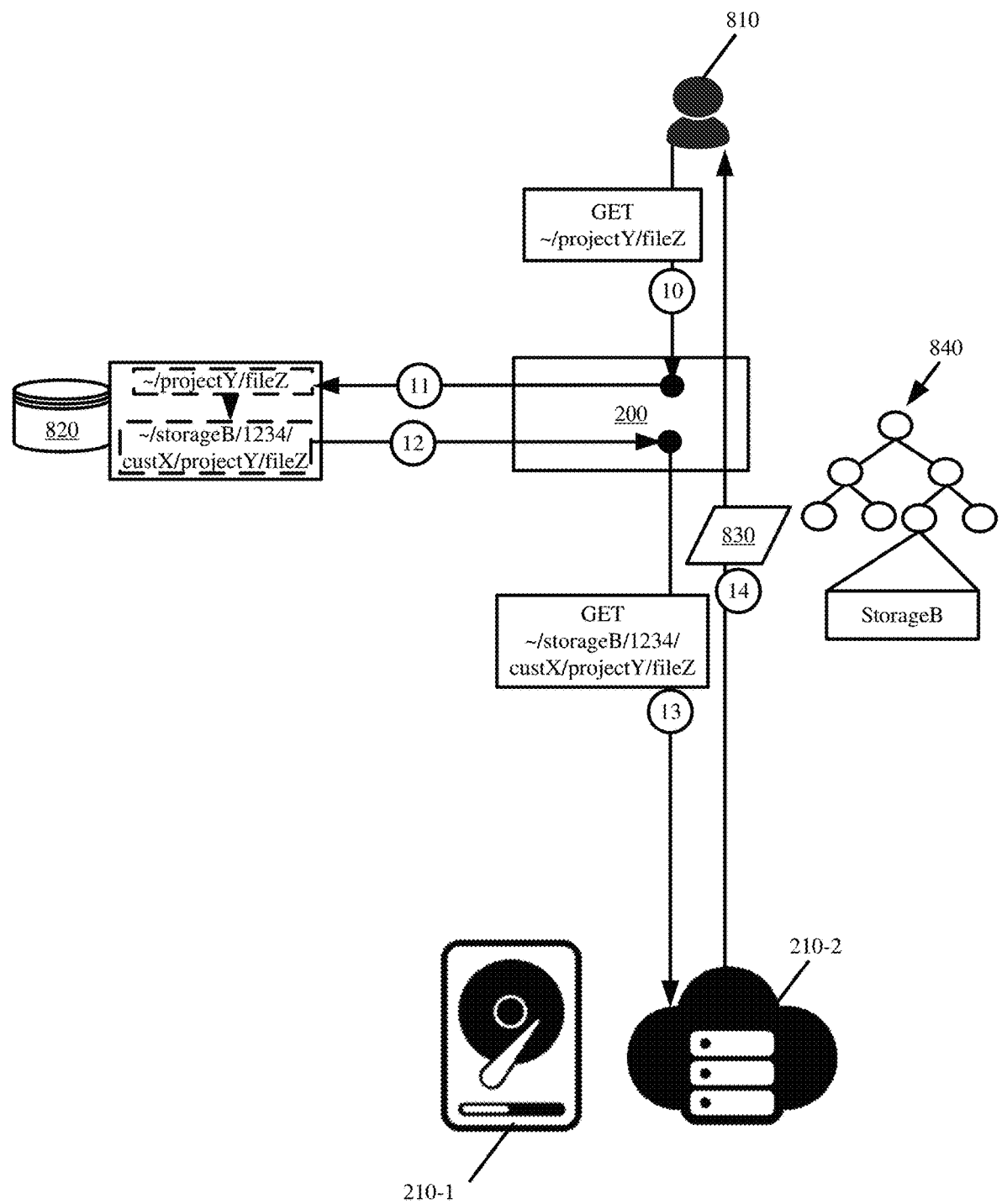

FIGS. 8A, 8B, and 8C illustrate an example of the file mapping operations performed by metadata-driven file system 200 in accordance with some embodiments described herein. As shown in FIG. 8A, user 810 may issue (at 1) a first request with a first identifier (e.g., first URI). Metadata-driven file system 200 may query (at 2) database 820 using the first identifier. Database 820 contains a mapping that links first identifier to a second identifier (e.g., second URI) that provides a particular path, link, or identifier for retrieving the requested file from first storage device 210-1. Database 820 may return (at 3) the second identifier to metadata-driven file system 200, and metadata-driven file system 200 may retrieve (at 4) file 830 from first storage device 210-1 using the second identifier. Metadata-driven file system 200 may respond to the first request with the first identifier by transmitting (at 5) file 830, that was retrieved using the second identifier, to user 810.

As shown in FIG. 8B, user 810 issues (at 6) a second request using the first identifier to place file 830 back into storage. Metadata-drive file system 200 may query (at 7) taxonomy 840 using the metadata of file 830 to identify a new rule to apply to file 830. The new rule may apply to file 830 when the metadata of file 830 changed, another part of file 830 changed, or file 830 progressed through a workflow defined by taxonomy 840. In this example, the matching rule specifies moving file 830 to second storage device 210-2. Accordingly, metadata-driven file system 200 may store (at 8) file 830 on second storage device 210-2 using a new third identifier that identifies the actual storage path or storage location of file 830 on second storage device 210-2. Metadata-driven file system 200 may update (at 9) the first identifier mapping at database 820 to change the mapping for the first identifier from the second identifier to the new third identifier that can be used to access file 830 on second storage device 210-2. Additionally, metadata-driven file system 200 may use the second identifier to delete the prior copy of file 830 from first storage device 210-1, and database 820 may remove the previous mapping between the first identifier and the second identifier.

As shown in FIG. 8C, user 810 may again request (at 10) file 830 using the first identifier even though metadata-driven file system 200 changed the physical storage location of file 830. Metadata-driven file system 200 may query (at 11) database 820 using the first identifier. Database 820 identifies the updated mapping linking the first identifier to the third identifier, and returns (at 12) the third identifier to metadata-driven file system 200. Metadata-driven file system 200 may use (at 13) the third identifier to retrieve file 830 from second storage device 210-2, and may respond (at 14) to the user request, that specified the first identifier by providing file 830 to user 810.

FIGS. 8A-8C thereby illustrate metadata-driven file system 200 abstracting the actual metadata-based distribution of files across storage devices 210 away from users. Consequently, the users can use the same URI or other identifier to access each file regardless of that file being moved between different storage devices 210 because of changing file metadata and different storage rules specified for the different metadata.

Figure 9:
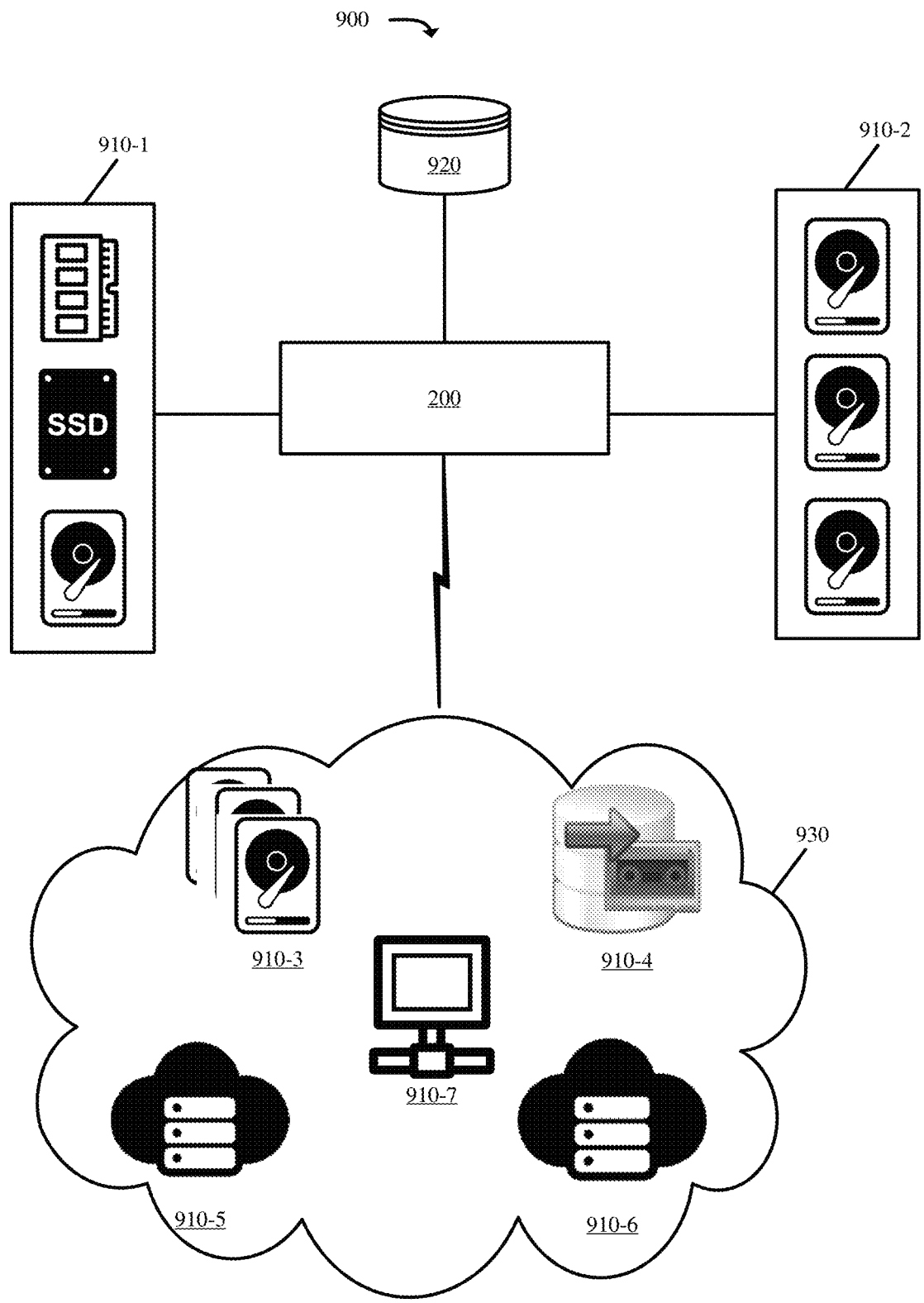
FIG. 9 illustrates an example environment in which one or more embodiments, described herein, may be implemented.

FIG. 9 illustrates an example environment 900 in which one or more embodiments, described herein, may be implemented. As shown in FIG. 9, environment 900 may include metadata-driven file system 200, storage devices 910-1, 910-2, 910-3, 910-4, 910-5, and 910-6 (herein sometimes collectively referred to as "storage devices 910" or individually as "storage device 910"), database 920, and network 930.

The quantity of devices, components, and/or networks, illustrated in FIG. 9, is provided for explanatory purposes only. In practice, environment 900 may include additional devices, components, and/or networks; fewer devices, components, and/or networks; different devices, components, and/or networks; or differently arranged devices, components, and/or networks than illustrated in FIG. 9. For example, storage devices 910 may have different tiered arrangements based on cost, performance, location, and/or other characteristics of storage devices 910. One or more of the devices of environment 900 may perform one or more functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900. For instance, metadata-driven file system 200 may be implemented on a machine with one or more of storage devices 910.

As described above, metadata-driven file system 200 may be used to control the storage of different files across storage devices 910 using file metadata and rules defined for a metadata taxonomy. Metadata-driven file system 200 may be a centralized or a distributed file system that runs on one or more devices. For instance, metadata-driven file system 200 may run from a device in an organization that other user devices submit file access requests to in order to access files stored across storage devices 910. Metadata-driven file system 200 may also be run on each machine that hosts one or more of storage devices 910. In some such embodiments, each instance of metadata-driven file system 200 may manage files across the storage devices that are under its control.

Storage devices 910 may include storage devices, systems, and/or components that may be differentiated based on one or more characteristics. For instance, storage devices 910 may be differentiated based on storage size, performance (e.g., read speed, write speed, seek time, network latency, etc.), cost, location, and/or other characteristics.

Storage devices 910 may include local storage devices (e.g., storage devices 910-1 and 910-2) that may be on the same physical machine or may be interfaced directly to the machine generating the file access requests or the machine running metadata-driven file system 200. Storage devices 910 may also include remote storage devices (e.g., storage devices 910-3, 910-4, 910-5, and 910-6) that receive access requests over network 930 from one or more user devices or that receive commands from metadata-driven file system 200 over network 930.

Remote storage devices 910-3, 910-4, 910-5, and 910-6 may include storage devices of one or more cloud-based systems. A cloud-based system may provide metadata-driven file system 200 with a changing amount of storage by dynamically allocating or deallocating storage from the cloud-based system.

In some embodiments, storage devices 910 may also include external systems 910-7 that metadata-driven file system 200 uses to store and/or access certain files. For instance, metadata-driven file system 200 may use a third-party video platform to store video files, and may use another third-party system to store secure or confidential files. For instance, external system 910-7 may include network-accessible storage devices provided by Box, Google, Microsoft, and other external systems that may be accessed and used by metadata-driven file system 200 for storing files of an organization.

In some embodiments, storage devices 910 may be distributed across different physical locations, thereby creating differentiated characteristics as a result of different network performance to access the storage devices at the different locations. For instance, remote storage device 910-5 may be located in a first geographic region (e.g., California) and remote storage device 910-6 may be located in a different second geographic region (e.g., Virginia). The different characteristics may be accounted for when defining the workflow/taxonomy rules for controlling the file distribution. For instance, rules may be defined to localize the storage location for uploaded files based on the location of the user uploading the file. Thus, if a user uploads a first file from a location on the west coast, metadata-driven file system 200 may prioritize storage of the first file to remote storage device 910-5 located in California, and if another user uploads a second file from a location on the east coast, metadata-driven file system 200 may prioritize storage the second file to remote storage device 910-6 located in Virginia.

Storage devices 910 may include any kind, type, or mix of storage devices. For instance, storage devices 910 may include magnetic disk drives, solid state drives, Random Access Memory (RAM), optical storage devices, and/or storage devices that use other storage technologies or storage mediums. Storage devices 910 may further include storage devices of different cloud-based systems that may provide long-term, slow, and/or data archival storage versus low latency, more expensive, and localized storage.

In any case, each storage device 910 may be accessed via a local interface or via network 930. Each storage device may be accessed using a directory path, URI, and/or other identifier.

Database 920 may be used to store the different taxonomies of an organization as well as the rules that defined for different key-value combinations of the taxonomies. Database 920 may also store the mappings for linking a first identifier used by a user to request a file to a corresponding second identifier that identifies the actual storage device and storage location of the file. In some embodiments, database 920 may be integrated as part of metadata-driven file system 200 or may be remotely accessed by metadata-driven file system 200.

Network 930 may allow devices of environment 900 to access one or more other networks or devices, a core network of a wireless telecommunications network, an Internet Protocol-based packet data network ("PDN"), a wide area network ("WAN") such as the Internet, a private enterprise network, and/or one or more other networks. In some implementations, network 930 may include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. Network 930 may be connected to, and/or otherwise in communication with, one or more other networks, such as a public switched telephone network ("PSTN"), a public land mobile network ("PLMN"), and/or another network. Different user devices may submit file access requests to metadata-driven file system 200 via network 930, and metadata-driven file system 200 may distribute files and access files from storage devices 910 via network 930.

Figure 10:
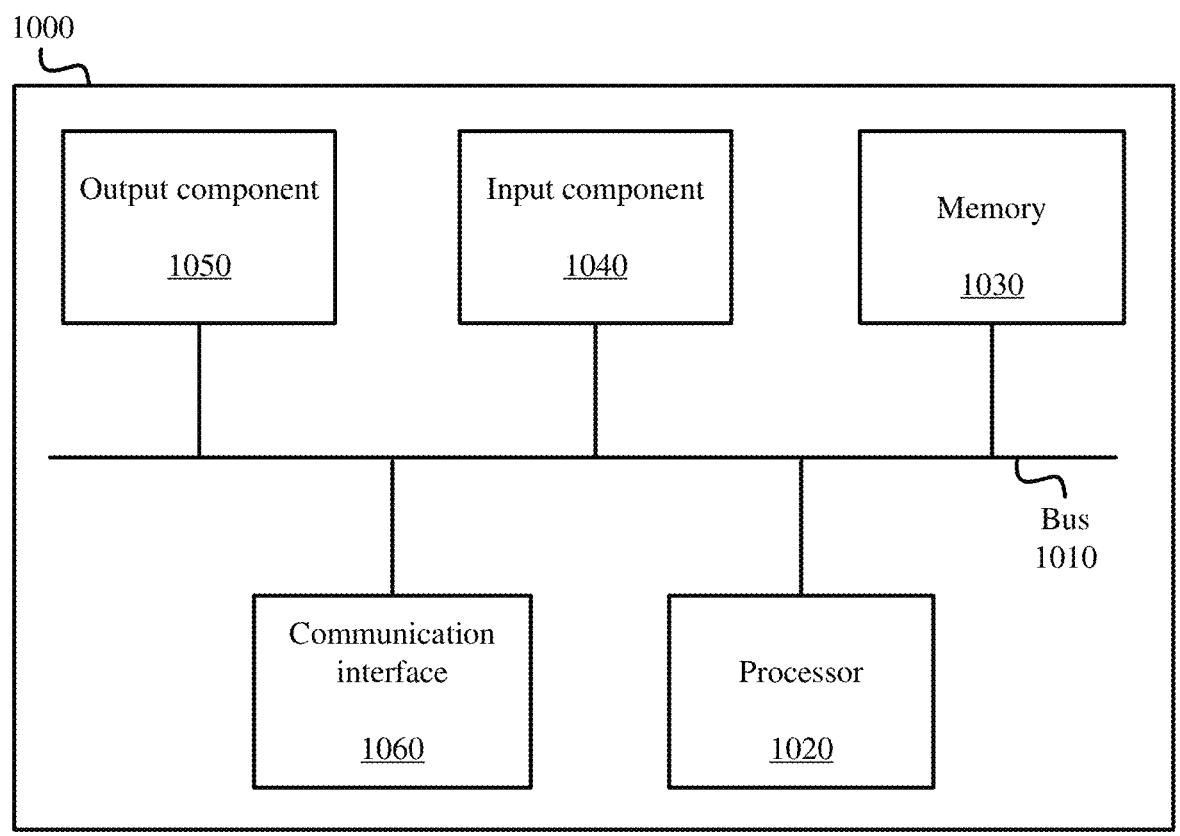
FIG. 10 illustrates example components of one or more devices, according to one or more embodiments described herein.

FIG. 10 is a diagram of example components of device 1000. Device 1000 may be used to implement the metadata-driven file system or a machine on which the metadata-driven file system 200 executes. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method implemented by a file system that controls file storage and access on a first storage device and a second storage device of a computer system executing the file system, the method comprising:
    determining, by execution of the file system, first characteristics of the first storage device and second characteristics of the second storage device;
    defining, by execution of the file system, a particular workflow comprising:
        a first state that is associated with a first status of a file and a first programmatic operation that prioritizes access to the file from the first storage device based on an association between the first status and the first characteristics of the first storage device, and
        a second state that is associated with a second status of the file and a second programmatic operation that prioritizes access to the file from the second storage device based on an association between the second status and the second characteristics of the second storage device;

detecting, by execution of the file system, a first user interaction with a particular file;

determining, by execution of the file system, that the first user interaction implements a first change to attributes or contents of the particular file and that the attributes or the contents of the particular file after the first change correspond to the first status associated with the first state of the particular workflow;

performing, by execution of the file system, the first programmatic operation that is defined for the first state of the particular workflow, wherein performing the first programmatic operation comprises:

defining one or more of a first set of metadata, a first set of access privileges, or a first storage location for the particular file without altering the attributes or the contents of the particular file; and storing the particular file with the first set of metadata and the first set of access privileges to the first storage location on the first storage device in response to the association between the first status and the first characteristics of the first storage device;

detecting, by execution of the file system, a second user interaction with the particular file;

determining, by execution of the file system, that the second user interaction implements a second change to the attributes or the contents of the particular file and that the attributes or the contents of the particular file after the second change correspond to the second status associated with the second state of the particular workflow; and performing, by execution of the file system, the second programmatic operation that is defined for the second state of the particular workflow, wherein performing the second programmatic operation comprises:

defining one or more of a second set of metadata, a second set of access privileges, or a second storage location for the particular file without altering the attributes or the contents of the particular file; and storing the particular file with the second set of metadata and the second set of access privileges to the second storage location on the second storage device in response to the association between the second status and the second characteristics of the second storage device.

2. The method of claim 1 further comprising:

receiving a request comprising a static path for accessing the particular file prior to detecting the second user interaction and after performing the first programmatic operation;

mapping the static path to a first dynamic path that is selected for the particular file based on the particular file having the first set of metadata; and providing the particular file from the first storage location on the first storage device that is accessed using the first dynamic path in response to the request.

3. The method of claim 2, wherein performing the second programmatic operation further comprises:

updating a mapping of the static path for the particular file by linking the static path to a second dynamic path instead of the first dynamic path, wherein the second dynamic path is the second storage location on the second storage device.

4. The method of claim 3 further comprising:

deleting a copy of the particular file with the first set of metadata from the first storage location in response to storing the particular file with the second set of metadata to the second storage location.

5. The method of claim 2 further comprising:

querying a mapping table using the static path in response to receiving the request; and retrieving the first dynamic path in response to the mapping table comprising an entry mapping the static path to the first dynamic path.

6. The method of claim 3, wherein the static path comprises a Uniform Resource Identifier ("URI") with which different users request and interact with the particular file;

wherein the first dynamic path corresponds to the first storage location on the first storage device at which the particular file with the first set of metadata is stored; and wherein the second dynamic path corresponds to the second storage location on the second storage device at which the particular file with the second set of metadata is stored.

7. The method of claim 1, wherein performing the second programmatic operation further comprises:

moving a storage location of the particular file from the first storage location accessed by a first dynamic path to the second storage location accessed by a second dynamic path.

8. The method of claim 1, wherein performing the second programmatic operation further comprises:

changing permissions for accessing the particular file at the second state of the particular workflow, wherein a first set of users are permitted to access the particular file with the first status from the first storage location of the first storage device, and wherein changing the permissions comprises one or more of restricting one or more of the first set of users from accessing the particular file with the second status from the second storage location of the second storage device, or adding one or more users to the first set of users that are permitted to access the particular file with the second status from the second storage location of the second storage device.

9. The method of claim 1, wherein the first programmatic operation is a first executable script, executable command, or system call that sets one or more of the first set of metadata, the first set of access privileges, or the first storage location for the particular file upon execution; and wherein the second programmatic operation is a second executable script, executable command, or system call that sets one or more of the second set of metadata, the second set of access privileges, or the second storage location for the particular file upon execution.

10. The method of claim 1, wherein performing the second programmatic operation further comprises:

generating a variant of the particular file with a different encoding or resolution than the particular file at the second storage location on the second storage device.

11. A file system comprising:

a first storage device;

a second storage device;

one or more processors configured to:

determine first characteristics of the first storage device and second characteristics of the second storage device;

define a particular workflow comprising:
  a first state that is associated with a first status of a file and a first programmatic operation that prioritizes access to the file from the first storage device based on an association between the first status and the first characteristics of the first storage device, and
  a second state that is associated with a second status of the file and a second programmatic operation that prioritizes access to the file from the second storage device based on an association between the second status and the second characteristics of the second storage device;
detect a first user interaction with a particular file;
determine that the first user interaction implements a first change to attributes or contents of the particular file and that the attributes or the contents of the particular file after the first change correspond to the first status associated with the first state of the particular workflow;
perform the first programmatic operation that is defined for the first state of the particular workflow, wherein performing the first programmatic operation comprises:
  defining one or more of a first set of metadata, a first set of access privileges, or a first storage location for the particular file without altering the attributes or the contents of the particular file; and
  storing the particular file with the first set of metadata and the first set of access privileges to the first storage location on the first storage device in response to the association between the first status and the first characteristics of the first storage device;
detect a second user interaction with the particular file;
determine that the second user interaction implements a second change to the attributes or the contents of the particular file and that the attributes or the contents of the particular file after the second change correspond to the second status associated with the second state of the particular workflow; and
perform the second programmatic operation that is defined for the second state of the particular workflow, wherein performing the second programmatic operation comprises:
  defining one or more of a second set of metadata, a second set of access privileges, or a second storage location for the particular file without altering the attributes or the contents of the particular file; and
  storing the particular file with the second set of metadata and the second set of access privileges to the second storage location on the second storage device in response to the association between the second status and the second characteristics of the second storage device.

12. The file system of claim 11, wherein the one or more processors are further configured to:
receive a request comprising a static path for accessing the particular file prior to detecting the second user interaction and after performing the first programmatic operation;
map the static path to a first dynamic path that is selected for the particular file based on the particular file having the first set of metadata; and
provide the particular file from the first storage location on the first storage device that is accessed using the first dynamic path in response to the request.

13. The file system of claim 12, wherein performing the second programmatic operation further comprises:
updating a mapping of the static path for the particular file by linking the static path to a second dynamic path instead of the first dynamic path, wherein the second dynamic path is the second storage location on the second storage device.

14. The file system of claim 13, wherein the one or more processors are further configured to:
delete a copy of the particular file with the first set of metadata from the first storage location in response to storing the particular file with the second set of metadata to the second storage location.

15. The file system of claim 12, wherein the one or more processors are further configured to:
query a mapping table using the static path in response to receiving the request; and
retrieve the first dynamic path in response to the mapping table comprising an entry mapping the static path to the first dynamic path.

16. The file system of claim 11,
wherein the static path comprises a Uniform Resource Identifier ("URI") with which different users request and interact with the particular file;
wherein the first dynamic path corresponds to the first storage location on the first storage device at which the particular file with the first set of metadata is stored; and
wherein the second dynamic path corresponds to the second storage location on the second storage device at which the particular file with the second set of metadata is stored.

17. The file system of claim 11, wherein performing the second programmatic operation further comprises:
moving a storage location of the particular file from the first storage location accessed by a first dynamic path to the second storage location accessed by a second dynamic path.

18. The file system of claim 11, wherein performing the second programmatic operation further comprises:
changing permissions for accessing the particular file at the second state of the particular workflow, wherein a first set of users are permitted to access the particular file with the first status from the first storage location of the first storage device, and wherein changing the permissions comprises one or more of restricting one or more of the first set of users from accessing the particular file with the second status from the second storage location of the second storage device, or adding one or more users to the first set of users that are permitted to access the particular file with the second status from the second storage location of the second storage device.

19. The file system of claim 11,
wherein the first programmatic operation is a first executable script, executable command, or system call that sets one or more of the first set of metadata, the first set of access privileges, or the first storage location for the particular file upon execution; and
wherein the second programmatic operation is a second executable script, executable command, or system call that sets one or more of the second set of metadata, the second set of access privileges, or the second storage location for the particular file upon execution.

20. The file system of claim 11, wherein performing the second programmatic operation further comprises:
    generating a variant of the particular file with a different encoding or resolution than the particular file at the second storage location on the second storage device.

\* \* \* \* \*